United States Patent [19]

Covey

[11] Patent Number: 5,745,755
[45] Date of Patent: Apr. 28, 1998

[54] METHOD FOR CREATING AND MAINTAINING A DATABASE FOR A DYNAMIC ENTERPRISE

[76] Inventor: Peter J. Covey, 34548 Falls Ter., Fremont, Calif. 94555

[21] Appl. No.: 636,773

[22] Filed: Apr. 19, 1996

Related U.S. Application Data

[63] Continuation of Ser. No. 177,611, Jan. 5, 1994, abandoned.

[51] Int. Cl.$^6$ .................................................. G06F 17/30
[52] U.S. Cl. ............................................. 395/619; 395/611
[58] Field of Search ................................. 395/619, 712, 395/611, 612

[56] References Cited

U.S. PATENT DOCUMENTS

| | | | |
|---|---|---|---|
| 4,276,597 | 6/1981 | Dissly | 395/601 |
| 4,631,664 | 12/1986 | Bachman | 395/611 |
| 4,648,036 | 3/1987 | Gallant | 395/619 |
| 4,686,620 | 8/1987 | Ng | 395/610 |
| 4,853,843 | 8/1989 | Ecklund | 395/619 |
| 5,404,525 | 9/1992 | Endicott et al. | 395/700 |
| 5,440,730 | 8/1990 | Elmasri et al. | 395/600 |
| 5,499,365 | 3/1993 | Anderson et al. | 395/619 |
| 5,535,386 | 7/1996 | Wang | 395/619 |

OTHER PUBLICATIONS

"Design Data Modeling with Versioned Conceptual Configuration", Kitagawa, Hiroyuki et al., Computer Software and Applications Conference 1989 COMPSAC, 1989 IEEE, June 1989.

"Optimal Versioning of Objects", Tsotras, Vassilis et al., Data Engineering, 1992 8th Int'l Conference, 1992 IEEE, Jun. 1992.

"Complex Objects in the Temporal Object System", Fotouchi, Farshad et al., Computing and Information, 1992 International Conference, 1992 IEEE, Jun. 1992.

Kim, *Introduction to Object–Oriented Database*, Sep. 1990, pp. 12–27, 106–119, 144–171.

Katz et al., "Database Support for Versions and Alternatives of Large Design Files," *IEEE Transactions on Software Engineering*, vol. Se–10, No. 2, Mar. 1984.

*Primary Examiner*—Thomas G. Black
*Assistant Examiner*—Hosain T. Alam
*Attorney, Agent, or Firm*—Schweitzer Cornman Gross & Bondell LLP

[57] ABSTRACT

A method for constructing and maintaining a database for the recordation of events in a dynamic enterprise provides for the creation of a token of a predefined standard which identifies a subject of the database, its attributes, and its relation to other database subjects. Included in the token are fields corresponding to both the date of recordation of the subject matter of the token, as well as a reference date which defines the actual creation date of the subject of the token. Additional tokens are created for each event in which a database subject participates. The additional tokens also carry fields corresponding to both the recordation date and the reference date for the event memorialized. Stored tokens cannot be altered or erased from the system. The database provides a complete event-by-event historical record of the enterprise.

3 Claims, 14 Drawing Sheets

| | | |
|---|---|---|
| 10 | DSDB-KEY-OBLIGATORY. | |
| 15 | DSDB-KEY-SUBJ-OCCURRENCE. | |
| 20 | DSDB-KEY-SUBJ-EVENT. | |
| 25 | DSDB-KEY-SUBJ-EVENT-DATE-IDI | PIC X(4). |
| 25 | DSDB-KEY-SUBJ-EVENT-TIME-ITI | PIC X(4). |
| 20 | DSDB-KEY-SUBJ-ACTION-CODE | PIC X(4). |
| 20 | DSDB-KEY-SUBJ-ACTOR. | |
| 25 | DSDB-KEY-SUBJ-ACTOR-SERIES | PIC X(4). |
| 25 | DSDB-KEY-SUBJ-ACTOR-INSTANCE | PIC X(12). |
| 15 | DSDB-KEY-SUBJ-ASCRIPTION. | |
| 20 | DSDB-KEY-SUBJ-ASCR-EVENT. | |
| 25 | DSDB-KEY-SUBJ-ASCR-DATE-IDI | PIC X(4). |
| 25 | DSDB-KEY-SUBJ-ASCR-TIME-ITI | PIC X(4). |
| 20 | DSDB-KEY-SUBJ-ASCR-IDEA-CODE | PIC X(4). |
| 20 | DSDB-KEY-SUBJ-ASCR-PERSON. | |
| 25 | DSDB-KEY-SUBJ-ASCR-SERIES | PIC X(4). |
| 25 | DSDB-KEY-SUBJ-ASCR-INSTANCE | PIC X(12). |
| 15 | DSDB-KEY-MGMT-SESSION-ID | PIC X(8). |
| 05 | DSDB-SUBJECT-DESCRIPTION. | |
| 10 | DSDB-SUBJ-LOCATION. | |
| 15 | DSDB-SUBJ-LOCATION-SERIES | PIC X(4). |
| 15 | DSDB-SUBJ-LOCATION-INSTANCE | PIC X(12). |
| 10 | DSDB-SUBJ-ASPECT. | |
| 15 | DSDB-SUBJ-ASPECT-SERIES | PIC X(4). |
| 15 | DSDB-SUBJ-ASPECT-INSTANCE | PIC X(12). |
| 10 | DSDB-SUBJ-CONTROL. | |
| 15 | DSDB-SUBJ-CONTROL-SERIES | PIC X(4). |
| 15 | DSDB-SUBJ-CONTROL-INSTANCE | PIC X(12). |

(ALL OTHER DESIRED DATA ATTRIBUTES)

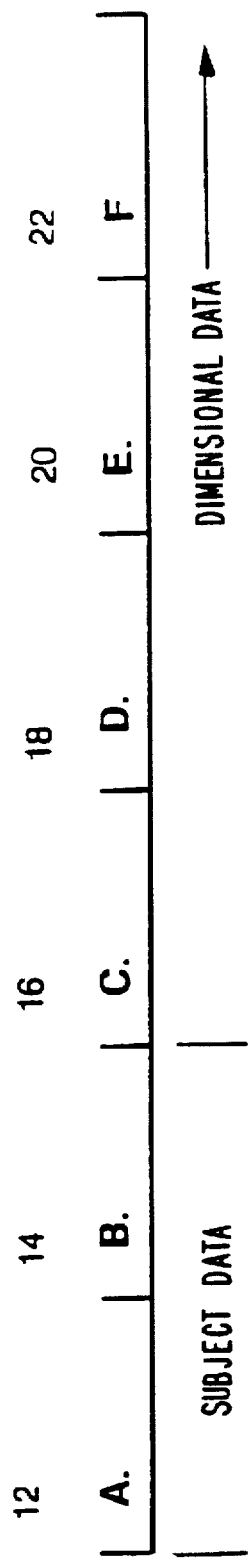
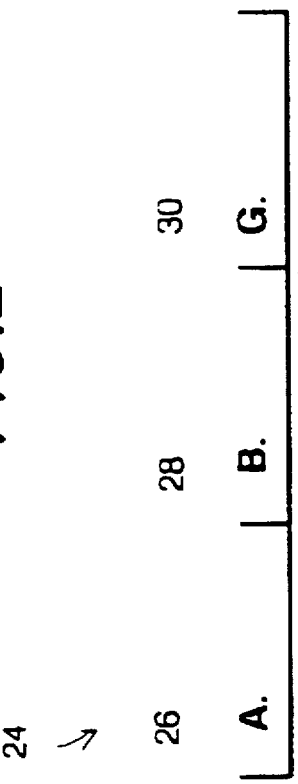

(62) (64) (66) (68) (70) (72) (74) (76) (78) (80) (82)

| | | |
|---|---|---|
| 05 | DSDB-MGMT-HEADER. | |
| 10 | DSDB-MGMT-ID | PIC X(4). |
| 10 | DSDB-MGMT-PROTOCOL. | PIC XX. |
| 10 | DSDB-MGMT-COMPRESS | PIC XX. |
| 10 | DSDB-MGMT-LEN-KEY | PIC S9(4) COMP. |
| 10 | DSDB-MGMT-LEN-DATA | PIC S9(4) COMP. |
| 10 | DSDB-MGMT-STATUS | PIC XX. |
| 10 | DSDB-MGMT-ACTION | PIC XX. |
| 10 | DSDB-MGMT-STACK-NR | PIC S9(8) COMP. |
| 10 | DSDB-MGMT-CONTRIBUTOR | PIC X(8). |
| 10 | DSDB-MGMT-CREATOR | PIC X(8). |
| 10 | DSDB-MGMT-RULE-SET | PIC X(4). |

| | | |
|---|---|---|
| 15 | DSDB-MGMT-FOLIO. | |
| 20 | DSDB-MGMT-CLIENT | PIC X(4). |
| 20 | DSDB-MGMT-DOMAIN | PIC X(4). |
| 15 | DSDB-MGMT-SUBJECT. | |
| 20 | DSDB-MGMT-SUBJ-SERIES | PIC X(4). |
| 20 | DSDB-MGMT-SUBJ-INSTANCE | PIC X(12). |
| 15 | DSDB-MGMT-ASSOCIATION. | |
| 20 | DSDB-MGMT-ASSN-SERIES | PIC X(4). |
| 20 | DSDB-MGMT-ASSN-INSTANCE | PIC X(12). |
| 15 | DSDB-MGMT-ASPECT. | |
| 20 | DSDB-MGMT-ASPE-SERIES | PIC X(4). |
| 20 | DSDB-MGMT-ASPE-INSTANCE | PIC X(12). |
| 15 | DSDB-MGMT-SESSION-ID | PIC X(8). |

```
15    DSDB-SUBJ-OCCURRENCE.
 20     DSDB-SUBJ-EVENT.
  25      DSDB-SUBJ-EVENT-DATE-IDI    PIC X(4).
  25      DSDB-SUBJ-EVENT-TIME-ITI    PIC X(4).
 20     DSDB-SUBJ-ACTION-CODE         PIC X(4).
 20     DSDB-SUBJ-ACTOR.
  25      DSDB-SUBJ-ACTOR-SERIES      PIC X(4).
  25      DSDB-SUBJ-ACTOR-INSTANCE    PIC X(12).
```

| | | | |
|---|---|---|---|
| 15 | DSDB-SUBJ-ASCRIPTION. | | |
| 20 | DSDB-SUBJ-ASCR-EVENT. | | |
| 25 | DSDB-SUBJ-ASCR-EVENT-DATE-IDI | | PIC X(4). |
| 25 | DSDB-SUBJ-ASCR-EVENT-TIME-ITI | | PIC X(4). |
| 20 | DSDB-SUBJ-ASCR-IDEA-CODE | | PIC X(4). |
| 20 | DSDB-SUBJ-ASCR-PERSON. | | |
| 25 | DSDB-SUBJ-ASCR-PERSON-SERIES | | PIC X(4). |
| 25 | DSDB-SUBJ-ASCR-PERSON-INSTANCE | | PIC X(12). |

| | | | |
|---|---|---|---|
| 10 | DSDB-SUBJ-LOCATION. | | |
| 15 | DSDB-SUBJ-LOCATION-SERIES | PIC X(4). | |
| 15 | DSDB-SUBJ-LOCATION-INSTANCE | PIC X(12). | |
| 10 | DSDB-SUBJ-ASPECT. | | |
| 15 | DSDB-SUBJ-ASPECT-SERIES | PIC X(4). | |
| 15 | DSDB-SUBJ-ASPECT-INSTANCE | PIC X(12). | |
| 10 | DSDB-SUBJ-OBJECT. | | |
| 15 | DSDB-SUBJ-OBJECT-SERIES | PIC X(4). | |
| 15 | DSDB-SUBJ-OBJECT-INSTANCE | PIC X(12). | |
| 10 | DSDB-SUBJ-CONTROL. | | |
| 15 | DSDB-SUBJ-CONTROL-SERIES | PIC X(4). | |
| 15 | DSDB-SUBJ-CONTROL-INSTANCE | PIC X(12). | |

(154)

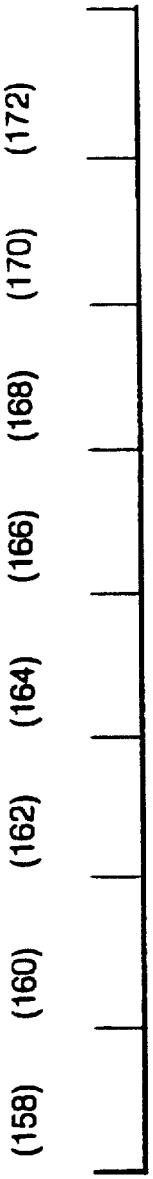
FIG.II
(156) (158) (160) (162) (164) (166) (168) (170) (172)
FIG.IIA
```
10  DSDB-ROOT-DIMENSION-LIST              OCCURS 100
        INDEXED BY DSDB-ROOT-DIMENSION-IDX.
    15  DSDB-ROOT-ASSOCIATION.
    20  DSDB-ROOT-ASSN-SERIES             PIC X(4).
    20  DSDB-ROOT-ASSN-INSTANCE           PIC X(12).
    15  DSDB-ROOT-ASPECT.
    20  DSDB-ROOT-ASPECT-SERIES           PIC X(4).
    20  DSDB-ROOT-ASPECT-INSTANCE         PIC X(12).
    15  DSDB-ROOT-SESSION-ID              PIC X(8).
    15  DSDB-ROOT-MEDIA-MGMT              PIC X(8).
    15  DSDB-ROOT-DEVICE-MGMT             PIC X(8).
    15  DSDB-ROOT-LOCATOR-MGMT            PIC X(8).
```
(174)

```
01          DSDB-ENCODED-TOKEN.

05        DSDB-TOKEN-MANAGEMENT.
    10      DSDB-TKN-MGMT-ID              PIC X(4).
    10      DSDB-TKN-MGMT-PROTOCOL        PIC XX.
    10      DSDB-TKN-MGMT-COMPRESS        PIC XX.
    10      DSDB-TKN-MGMT-LEN-KEY         PIC S9(4)    COMP.
    10      DSDB-TKN-MGMT-LEN-DATA        PIC S9(4)    COMP.
    10      DSDB-TKN-MGMT-STATUS          PIC XX.
    10      DSDB-TKN-MGMT-ACTION          PIC XX.
    10      DSDB-TKN-MGMT-STACK-NR        PIC S9(8)    COMP.
    10      DSDB-TKN-MGMT-CONTRIBUTOR     PIC X(8).
    10      DSDB-TKN-MGMT-CREATOR         PIC X(8).
    10      DSDB-TKN-MGMT-RULE-SET        PIC X(4).

05        DSDB-KEY.
    10      DSDB-KEY-DISCRETIONARY.
      15    DSDB-KEY-MGMT-FOLIO.
        20  DSDB-KEY-MGMT-CLIENT          PIC X(4).
        20  DSDB-KEY-MGMT-DOMAIN          PIC X(4).
      15    DSDB-KEY-MGMT-SUBJECT.
        20  DSDB-KEY-MGMT-SUBJ-SERIES     PIC X(4).
        20  DSDB-KEY-MGMT-SUBJ-INSTANCE   PIC X(12).
      15    DSDB-KEY-MGMT-ASSOCIATION.
        20  DSDB-KEY-MGMT-ASSN-SERIES     PIC X(4).
        20  DSDB-KEY-MGMT-ASSN-INSTANCE   PIC X(12).
      15    DSDB-KEY-MGMT-ASPECT.
        20  DSDB-KEY-MGMT-ASPE-SERIES     PIC X(4).
        20  DSDB-KEY-MGMT-ASPE-INSTANCE   PIC X(12).
```

FIG.12A

| | | |
|---|---|---|
| 10 | DSDB-KEY-OBLIGATORY. | |
|   15 | DSDB-KEY-SUBJ-OCCURRENCE. | |
|     20 | DSDB-KEY-SUBJ-EVENT. | |
|       25 | DSDB-KEY-SUBJ-EVENT-DATE-IDI | PIC X(4). |
|       25 | DSDB-KEY-SUBJ-EVENT-TIME-ITI | PIC X(4). |
|     20 | DSDB-KEY-SUBJ-ACTION-CODE | PIC X(4). |
|     20 | DSDB-KEY-SUBJ-ACTOR. | |
|       25 | DSDB-KEY-SUBJ-ACTOR-SERIES | PIC X(4). |
|       25 | DSDB-KEY-SUBJ-ACTOR-INSTANCE | PIC X(12). |
|   15 | DSDB-KEY-SUBJ-ASCRIPTION. | |
|     20 | DSDB-KEY-SUBJ-ASCR-EVENT. | |
|       25 | DSDB-KEY-SUBJ-ASCR-DATE-IDI | PIC X(4). |
|       25 | DSDB-KEY-SUBJ-ASCR-TIME-ITI | PIC X(4). |
|     20 | DSDB-KEY-SUBJ-ASCR-IDEA-CODE | PIC X(4). |
|     20 | DSDB-KEY-SUBJ-ASCR-PERSON. | |
|       25 | DSDB-KEY-SUBJ-ASCR-SERIES | PIC X(4). |
|       25 | DSDB-KEY-SUBJ-ASCR-INSTANCE | PIC X(12). |
|   15 | DSDB-KEY-MGMT-SESSION-ID | PIC X(8). |
| 05 | DSDB-SUBJECT-DESCRIPTION. | |
|   10 | DSDB-SUBJ-LOCATION. | |
|     15 | DSDB-SUBJ-LOCATION-SERIES | PIC X(4). |
|     15 | DSDB-SUBJ-LOCATION-INSTANCE | PIC X(12). |
|   10 | DSDB-SUBJ-ASPECT. | |
|     15 | DSDB-SUBJ-ASPECT-SERIES | PIC X(4). |
|     15 | DSDB-SUBJ-ASPECT-INSTANCE | PIC X(12). |
|   10 | DSDB-SUBJ-CONTROL. | |
|     15 | DSDB-SUBJ-CONTROL-SERIES | PIC X(4). |
|     15 | DSDB-SUBJ-CONTROL-INSTANCE | PIC X(12). |

(ALL OTHER DESIRED DATA ATTRIBUTES)

FIG.13

| 182 FOLIO | 184 SUBJECT | 186 ASSOCIATION | 188 ASPECT | 190 EVENT | 192 ACT | 194 ACTOR | 196 ASCRIBE | 198 IDEA | 200 ASCRIBER | 202 SESSION |
|---|---|---|---|---|---|---|---|---|---|---|
| 204 C12DA484 | WBUY13300190300 | | \*\*\*\* | 1E7FDFFFF 16CACFFFF 1983-05-23-00.00.00 | -WA- | CUST 5294350 0000-00-00-00.00.00 | 1FFFFFFFF 1FFFFFFFF | 1FFFF 1FFFF | 1983-05-23-00.00.00.000000 | 1FAAB49FF 166D33FFF |
| 206 C12DA484 | WBUY13300190300 | | WSUM | 1E6FFFFFF 16C76FEFF 1993-08-09-00.01.00 | -WH- | CREPTWBVT93 0000-00-00-00.00.00 | 1FFFFFFFF 1FFFFFFFF | 1FFFF 1FFFF | 1993-08-09-17.00.00.000000 | 1F87889FF 1510998FF |
| 208 C12DA484 | WBUY13300190300 | WFEE43396I356604 | | 1E6FFFFFF 16C68FFFE 1993-09-07-00.00.00 | -JB- | CREPTWB2350 0000-00-00-00.00.00 | 1FFFFFFFF 1FFFFFFFF | 1FFFF 1FFFF | 1993-09-11-00.37.00.917647 | 1F7E63970 15E663CDF |
| 210 C12DA484 | WBUY13300190300 | WFEE43396I356604 | | 1E6FFFFFF 16C76FFFF 1993-08-09-00.00.00 | -WB- | CREPTWB2030 0000-00-00-00.00.00 | 1FFFFFFFF 1FFFFFFFF | 1FFFF 1FFFF | 1993-08-09-00.00.00.000000 | 1F87C57FF 151E97FFF |
| 212 C12DA484 | WBUY13300190300 | WFEE534557000108 | | 1E6FFFFFF 16C67FFFF 1993-09-08-00.00.00 | -WB- | CREPTWB2030 0000-00-00-00.00.00 | 1FFFFFFFF 1FFFFFFFF | 1FFFF 1FFFF | 1993-09-08-18.37.49.126090 | 1F71A7937 15F3C8A5F |

FIG.13A

```
214
C12DA484|CUST5294350|        |****   |E7FDFFFF|-LP-|        |FFFFFFF|FFFF|        |FAAB49FF
         |           |        |       |6CACFFFF|    |        |FFFFFFF|FFFF|        |66D33FFF
         |           |        |       |1983-05-23-00.00.00   |0000-00-00-00.00.00   |1983-05-23-00.00.00.000000

216
C12DA484|CUST5294350|        |NAME   |E7FDFFFF|-LN-|CUST5294350|E6FFEDCF|EEDD|        |F8F7B43F
         |           |        |       |6CACFFFF|    |           |6C7DB76F|4276|        |51F72CFF
         |           |        |       |1983-05-23-00.00.00     |1993-08-02-14.28.39.000000

218
C12DA484|CUST5294350|        |NAME   |E7FDFFFF|-LN-|CUST5294350|FFFFFFF|FFFF|        |FAAB49FF
         |           |        |       |6CACFFFF|    |           |FFFFFFF|FFFF|        |66D33FFF
         |           |        |       |1983-05-23-00.00.00     |0000-00-00-00-00-00   |1983-05-23-00.00.00.000000

220
C12DA484|CUST5294350|CASH509964919597|        |E6FFFFFF|-JC-|CREPTWB2350|FFFFFFF|FFFF|        |F7E63970
         |           |                |        |6C68FFFF|    |           |FFFFFFF|FFFF|        |5E6C3CDF
         |           |                |        |1993-09-07-00.00.00     |0000-00-00-00.00.00   |1993-09-11-00.37.00.917647

222
C12DA484|CUST5294350|CASH509964919597|        |E6FFFFFF|-C- |CUST5294350|FFFFFFF|FFFF|        |F7247BF3
         |           |                |        |6C68FFFF|    |           |FFFFFFF|FFFF|        |5E8A24BF
         |           |                |        |1993-09-07-00:00:00     |0000-00-00-00.00.00   |1993-09-07-18.01.59.366420

224
C12DA484|CUST5294350|NODE133001910   |NWBUY1330019103001|E7FDFFFF|-WA-|CUST5294350|FFFFFFF|FFFF|        |FAAB49FF
         |           |                |                  |6CACFFFF|    |           |FFFFFFF|FFFF|        |66D33FFF
         |           |                |                  |1983-05-23-00.00.00   |0000-00-00-00.00.00   |1983-05-23-00.00.00.000000
```

METHOD FOR CREATING AND MAINTAINING A DATABASE FOR A DYNAMIC ENTERPRISE

This is a continuing application of U.S. Ser. No. 08/177,611 filed on Jan. 5, 1994, now abandoned.

The present invention relates to methods of encoding and storing information in a database-type environment.

BACKGROUND OF THE INVENTION

Information processing systems include but are not limited to computing devices, as well as transmission and storage devices. These various devices store and transmit representations of data encoded in a format which allows operations designed by the user to be performed thereon.

All information processing systems as well as their associated storage devices and associated transmission devices are by their fundamental nature two-dimensional. They are capable of representing information as signal or data strings one signal deep and N signals long. The meaning attached to a signal string is independent of and external to the signal arrangement itself.

In order to store or transmit information within an information processing system and any of its associated devices, it is necessary to encode the information into the appropriate signal structure. The signal structure so created takes the form of a "token".

A "token", as the term is used here, is also commonly called a "record", a "segment", etc. A group of tokens, records, segments, et. al. may be collected into a "file", one or more files constituting a "database". The term "token" is chosen in preference to the several alternatives because "token" denotes that something has been created or defined as a convenience to represent something else entirely different. This is exactly the case with data records in information systems.

A token can be expressed as a combination of many different styles and types of signals, depending on the processing environment in which it appears, without losing either its structure or meaning, that is, its information carrying capacity. The number of individual signals required to express a token is determined by the design of the token as a method of expressing information. Different information processing devices may require different signals and signal sequences in order to express the same tokenized information.

Tokens are devised by systems designers as a media for the expression of information about something. To a limited degree, that something might be the token itself. Typically, tokens are not created for their own sake, but rather as a media for the expression of information about persons, events, objects, energy, places, time, ideas, concepts, etc., which exist in the natural world or in the minds of persons.

For information to be stored and processed about an event or an object in the real world, that object or event must be observed so that its information can be quantified. For information to be stored and processed about an idea, rule, or concept, that idea, rule, or concept must be expressed by the person in whose mind it arose. In turn, the expressed event must first be observed.

A single observation occurs at a particular moment in time and is also an event. Subsequently and separately, the one or more observations must be interpreted. An interpretation is also an event. Only after the observation and interpretation events have been completed is it possible to undertake the encoding process which gives rise to the creation of one or more tokens appropriate for use within an information processing system, a transmission device, or any associated devices.

The observation, interpretation and encoding events are each separate and essential dimensions and necessary conditions for the creation of tokens. This is in addition to the essential precondition that the real world object or event which is the subject of the token has an observable existence.

The focus of attention for information processing systems is upon the signals which express the content of tokens and the manipulation of the token objects. The focus of attention of the people who cause tokens to be created and use them for various purposes is upon the subject matter that is of interest to them and the meaning encoded into the token object.

The basis of information arises from the occurrence of events in the natural world. Once an event has occurred, this remains a fact forever. When an event occurs, it has participants, all of which must also have a real existence.

A great deal of attention by information systems designers is focused upon the real events which occur during commercial, political, and scientific intercourse. Describing these events, their participants, and their significance leads to the need for several kinds of tokens, and a recognition that all information is not equivalent. Events require participants before they can occur with one participant in the role of "cause". The populations of potential participants is the content of the physical universe, more particularly, the persons, objects and other basis of causation.

Each participant by its mere existence can form the basis of a token in a database of information, at the discretion of the database designer/operator, to manifest that participant, provided that the existence of that participant has come to the attention of the database designer/operator through the observation, interpretation sequence.

When a database designer/operator creates a token to manifest a participant, he does so by expressing ideas gained through observation-interpretation about that participant and encodes those expressions into a token object (database record or segment). The process of describing real world things (participants and events) is generally known as "abstraction". The properties and characteristics of the subject are studied through observation and interpretation giving rise to "dimensions" of the subject itself. Tokens can then be created to carry information about one or more of these dimensions.

A continuing problem for the database designer is in making the distinction between an attribute and a data value. The first step is identifying the attributes or dimensions of the subject for recordation and storage. The second step is supplying a storable value for that attribute. The problem of aliases is discussed later and is a valid case of a subject acquiring or requiring the assignation of new dimensions over time. The problem of several observation-interpretation sequences resulting in competing value candidates for a lone dimension is at the heart of the dilemma of "update-in-place" technology.

The rules applied during interpretation and the resulting value that is chosen to describe a dimension might later be replaced by the results of a subsequent observation-interpretation sequence. For example, during an observation it might be determined that the volume of a jar measured 5,312.9 cubic centimeters. Subsequently, and independently, another observation might determine that the volume of the same jar measured 5,313.6 cubic centimeters. We have now two observation-interpretation sequences which are competing to supply a value for that dimension of the subject jar known as volume measured in cubic centimeters.

Separate and additional dimensions might be color, weight, height, etc. Each dimension can more or less stand on its own, and be the topic of its own series of observation-interpretation sequences, and in this way be a focus of many tokens, each competing to supply a value for the dimension at issue.

A particular characteristic of participants and events is their mutual dependence. Events cannot occur without participants and participants cannot be known until they participate in events, casually or actively. For example, we smash atoms to see what the participant sub-atomic particles are by observing the events in which they participate during their lifetime, however brief. This interdependence between participants and events is called "bilateral association" or "bilateral participation". Each participant becomes a dimension of an event, and each event becomes a dimension of a participant. In addition, the time and place of the event are always dimensions of the event, and the event becomes a dimension of the place in which it occurred. The configuration of "natural attributes" of an event are outlined below.

The remaining source of tokens is from the process of "unilateral free association". This is also the source of "dimensions" which do not arise naturally in the real world, but rather arise as ideas or concepts ascribed to things. Ideas are the product of mental activity and can thus arise without any participation with other things outside the mind in which they occur.

Unilateral free association is the means by which singular real events are viewed with often conflicting and contradictory meanings, depending on the perspective of the observer or opinion holder. Long after events are concluded, such as the acceptance of the United States Constitution, new ideas and rules are invented to further amend, explain, embellish, invalidate or otherwise alter its meaning. Many of these subsequent ideas give rise to tokens as manifest by the existence of law libraries stored on computing devices.

Another common example of unilateral free association is the ascription of brand names to objects of commerce, for example, computing devices themselves. A brand name may be changed freely without any participation on the part of the device itself. In fact, a brand name may be ascribed to something that does not, and for that matter, may never exist. Unilateral free association is thus a means of ascribing attributes (dimensions) to both real and purely imaginary objects.

A database designer must therefore deal with fundamentally different information sources and translate them into token structures organized around subjects, then build tokens suitable for storage in two dimensional devices, while at all times maintaining the underlying integrity of the descriptions of those subjects as known by their various attributes or dimensions. In addition, the database designer must provide for amendment of established dimensions, the addition of new dimensions through unilateral free association, and the addition of new tokens derived from bilateral participation.

In the present art there are no standard methods for the creation of tokens or the expression of dimensions. Each database designer/operator creates and organizes tokens in any way that appears to meet his perceived convenience. Even when two designers are working with identical populations of participants and events, the probability that they will simultaneously apply identical unilateral free association to the endeavor is statistically remote.

Subjects in a database are those participants, events, and ideas of interest to the database designer/operator, as discussed in the foregoing. Each instance of any subject may give rise to one or more tokens. In the present art, a designer devises a token organized "at will" around any subject, object, person, thing, idea, rule, event, etc., without any distinction. The attributes or characteristics selected for inclusion by the designer following the present art, are those "dimensions" suited to his perceived need, to provide a snapshot of values as they exist at some point in time". Most commonly, that point in time is the "now" or "current" time.

The methods of the present art assume and typically utilize a limited, reusable, storage media. When a change of a value must be carried into the database (amendment of a token) the then existing state of that database is changed, typically by an "update" procedure which overwrites the new value in place of the old. Thus, under the reusable media method the preexisting state of the database is lost. The changed value replaces the previous value. In short, this is "update-in-place" technology.

As other, subsequent values are processed, subsequent updates in-place occur, with the then current state of the database again being overwritten and changed to reflect each new value. Therefore the validity of any state in a database only holds until another database store, update, or delete action occurs. Once the action occurs, the elements of the earlier state are typically lost. These state changes can occur hundreds of times per second in an active database. On the other hand, they may occur once in a lifetime, or never, depending on the frequency of occurrence of underlying events.

Returning for a moment to the example of the jar, which of the candidate values for the measure of volume will survive? The first value may have been recorded in the database and remained there for a number of years. With update-in-place technology, the revised value would destroy both the first stored value and also the fact of its existence during those years when it was the "value of record". Any decisions made based on the original value are now retroactively invalidated. Equally important, there is no basis upon which to identify those decisions.

In a system which deals with real property ownership records, this can pose serious problems. So serious, that an entire industry has been developed just to deal with the consequences, namely, the title insurance industry.

Update-in-place technology produces cascading data integrity problems. No effective mechanism has heretofore been invented to deal with the consequences of this particular feature of update-in-place. Update-in-place databases acquire a new current state upon the execution of each update. The resulting "state" has a period of validity which lasts until the next update occurs. This period of validity can be as short as a minute fraction of a second to as long as forever. The determining factor is the frequency of events entirely outside and independent of the database itself, but which the database is attempting to mirror. State conditions in a conventional database, regardless of their frequency of change, can only be preserved by procedures and methods entirely external to and independent of the actual database operation and architecture.

Another problem facing the database designer is the fact that subjects are necessarily multi-dimensional while the storage technology is two-dimensional. It is not uncommon for a subject to have numerous attributes or dimensions. If a subject possess, say, twelve dimensions, then it would require a twelve-dimensional storage media to represent the subject in the most straightforward manner.

To clarify the distinction between event dimensions and subject dimensions, consider the following. Events when they occur possess natural attributes which are automatically dimensions of the event. The definition of "dimension" is taken in this context from the physical sciences as any physical property regarded as a fundamental measure of the event. In addition, events acquire added dimensions ascribed by observers as well as by database designer/operators.

Subjects are topics of interest to people. Subjects come into existence only through the mechanism of unilateral free association. After their occurrence, events may be organized into subjects, that is, have subject oriented dimensions ascribed to them.

Computing devices at this point are fundamentally two dimensional, and therefore it becomes essential that each of the dimensions of a subject be identified, codified, and organized into a two-dimensional token scheme that is suitable for the devices employed to store it on the one hand, and sufficiently consistent in its structure so as to be useful to the database designer/operator on the other hand.

In the operation of the natural world there are predictable, verifiable dimensions of every event. This is an element of structure described in considerable detail by the physical sciences. These can be divided into seven primary categories:

Every event is caused by some (1) ACTOR participant and conveys an effect upon some (2) OBJECT participant. (Cause and effect are basic tenets of our physical universe.) Every event occurs under the (3) CONTROL of a set of rules or laws, either the laws of physics or laws of human invention.

Every (4) EVENT occurs at some point along the time continuum. Time is an ever present feature of our physical universe whose measurement is highly institutionalized as date and time. Every event occurs at some (5) LOCATION in three-dimensional space.

Every event embodies a particular (6) ACTION between the participants. Every event has a particular character or (7) ASPECT that forms the common basis of an association between the bilateral participants. (In human affairs this is often an expression of purpose.)

These seven attributes are seven fundamental dimensions of every event. When they are encoded into a token, the token can be completely and uniquely identified to that event which is the basis of the token's existence.

The seven fundamentals are always present. This does not mean that values are attempted for them by a particular database designer/operator. There are valid cases when the "correct" value is unknown or unknowable. This cannot be used to deny the existence of the attribute. It is a fundamental premise of the present invention that the attributes are acknowledged for each token created, even if a value cannot be presently assigned.

For example, in a criminal justice database, reports of crimes may be routinely recorded. The identity of the perpetrator (actor) is often unknown. If the crime remains unsolved, the identity of the perpetrator may become unknowable. This coincidence of unknowability cannot be elevated to a fundamental because to do so would violate the cause and effect premise upon which the natural world works. In the present art, it is not uncommon to omit any provision for some dimensions because they are considered "unknowable" or not worth knowing in the opinion of the database designer/operator. This leads to fundamental error in data structures and the tokens that comprise them.

While a certain discipline must guide the design of a database based on how events occur and their underlying fundamentals, this does not complete the overall picture. New dimensions are added after the fact, so to speak.

Consider again the case of the lone perpetrator of a crime. We would seek to learn his/her name. A name, unfortunately, is not a true identifier. A fingerprint would be. It is a physical part of the person. It is an observable, verifiable attribute. A name, on the other hand, is assigned by unilateral free association. A lone person may be known simultaneously by many names. Sometimes this is coincidental, such as with nicknames, or intentional such as with aliases.

Each alias serves to add a new dimension or attribute to the data structures. This point was referenced earlier in the discussion. The problem of competing data values has been explained. Here the problem of additional dimensions is discussed. The different names are not competing to supply a value for a single dimension. Each name is a separate dimension in its own right. Just as a "social security number" is a dimension of a person acquired through unilateral free association from a government agency. Social security number is a form of an alias, akin to an employee number, a driver's license number, and all other such designations. For one of these designations to become an attribute through bilateral participation would require the person to submit to a tattoo.

The addition of new dimensions is accomplished via the process of unilateral free association. The ascriber is a person or the proxy of a person, such as a computer program. The object of the ascription is the event or thing, manifest by its token, to which an idea is "attached". In the case of our lone perpetrator, the actor doing the ascribing is the person himself, and the object of the ascription is coincidentally the same "himself" as manifest by the token that represents the event of his "coming into the system". Such ascription can be quantized by several additional attributes:

Every ascription is an event and occurs at some point in (8) TIME. Every ascription embodies a particular (9) IDEA. Every ascription is rendered by a (10) PERSON or proxy.

The final group of universals deals with building subject oriented "data structures" within the two-dimensional space in which tokens are stored. These data structures are of enormous importance to the database designer/operator. In his view this is the "true" database.

Every token manifests (11) SUBJECTs of interest to the database designer/operator. Every attribute encoded in a token can be the basis of a subject structure in a database. That is, if there are twelve attributes or dimensions encoded in a token, any one of them can serve in the "subject" position as the basis of a data structure. Conceivably all twelve could simultaneously be treated as subjects by the database designer/operator.

The simultaneity of dimensions would be served ideally in a twelve dimensional storage media, which could treat each dimension equally. Since this is not yet available, it becomes necessary to devise other methods to represent, organize, and access the token when it is stored.

Every token manifests (12) ASSOCIATIONs between each pair of encoded dimensions. While any particular pair may or may not be meaningful in the larger context, each dimension actually expresses an association. In the case of a complex expression such as a street address, an entire cluster of attributes must be considered together in order to effectively express the association.

The database designer/operator may elect candidate dimensions to express associations that hold a particular meaning to him, given his purpose, notwithstanding that statistically the number of possible combinations is "d!", the factorial of the number of dimensions. The practical number is quite modest. This arises because a great number of attributes describing an event or object are mutually dependent, and must be considered in clusters. The elements of a street address, composed of house number, street pre-directional, street post-directional, street name, street suffix, city name, state name, postal code, etc. cannot be easily separated. It should be apparent that all of these designations are the product of unilateral free association.

As a group, the several attributes are useful, while standing alone they seldom have meaning. Address and date are two of the most commonly occurring complex, multiple attribute expressions in informations systems. No date has meaning standing alone. A date can only be of some event, placing the event along the time continuum. This makes it obligatory that other attributes be present along with date in order to create meaning.

Every token manifests some (13) ASPECT of the entire population of events involving a particular subject. For example, take the case of a business transaction between a buyer and a seller. The buyer agrees to purchase goods from the seller and manifests this by the issuance of a purchase order. The seller manifests his acceptance by the issuance of an acknowledgement. The seller ships the goods. The buyer receives them. The seller issues an invoice. The buyer sends money in payment of the invoice. The seller receives the money and applies its value to the invoice, thereby completing the "business transaction".

This scenario was outlined in a "logical" sequence. The actual sequence of events can be very much different. In any case, in pure event terms, a lot is going on. The events are all related in some way without regard to timing or order. What they have in common is the fact that they are all a part of the "business transaction". That is, they make up one aspect of the association between buyer and seller.

In a completely robust database which stores all of the elements of all of the events and holds a complete picture of the interaction between buyer and seller, the interplay would be quite clear. However, this is seldom the case. The buyer designs and operates his database from his point of view, and likewise the seller designs and operates his database from the reverse view, or approximately reverse view. Database designers are typically working with only half of the picture, so to speak. And the issue is further clouded by organizational history, industry trade practice, and the intuitive preferences of individuals.

Nonetheless, neither could complete the business transaction if it were not for sufficient clues so as to permit the recognition of this aspect of their interaction. For example, the shipping documents show a purchase order number, as does the invoice. The payment documents show the invoice number, etc. In other words, there is a continuous exchange of clues between the parties so that the business transaction aspect of their relationship can go forward.

In the present art, a great deal of this has been overlooked and taken for granted. In the present art, hierarchical data models focus upon data structures organized around subjects and secondarily around associations. This is the basis of the so-called "parent-child" relationships in database structures. This forms the intuitive basis of the hierarchical model. It is inherently one-sided. Data structures maintained by the buyer would be unrecognizable to the seller, and likewise the reverse is true.

The relational model focuses upon data structures organized around associations, as its name implies. Its subjects are called "entities" and their associations are called "relationships". This forms the intuitive basis of the "entity-relationship" model. Again, the buyer's data structures would be largely unrecognizable to the seller.

The network model intuitively recognizes that hierarchies and relationships exist simultaneously and therefore attempts to link tokens together through networks of record chains. To work successfully, the network model really needs to have access to both sides of the transaction, and as a practical matter this never occurs. Databases are inherently maintained in one-sided fashion limited to the domain of interest peculiar to their designer/operators.

BRIEF DESCRIPTION OF THE INVENTION

The present invention embraces a process for constructing and encoding information-containing elements or tokens within an information processing system and its associated storage devices and transmission devices.

The present invention further embraces a process for storing and retrieving the tokens, thereby creating, organizing, and managing a database of information. The process preserves at all times all state conditions which ever existed in the database, and is independent of any storage media utilized by the information processing system.

The two process taken together preserve at all times the several dimensions of data that may simultaneously exist, and permits the orderly transformation of subject information into two-dimensional objects. The processes separate the management of objects from the expression of information about subjects of interest to the database user.

The method of the present invention incorporates the following premises:

1. The observance of a minimum standard of token construction by the database designer/operator.

2. The occurrence of an event is the sole basis of information and that once an event occurs this remains a fact forever.

3. Every event occurring within the natural world possesses a predictable and ever present set of dimensions, one of which is "time".

4. Once a token is committed as a storable object it must not change. The token represents a single state in the set of necessary conditions that led to its creation. If the token is permitted to change, this would contradict the axiom that the occurrence of an event is a fact forever. Thus the present methodology allows the retention of all tokens.

The external operations upon tokens performed by transactions are non-destructive, and include STORE and RETRIEVE. Once stored, a token is never erased or updated. UPDATE and ERASE are expressly prohibited operations. Once initially stored in any of the information processing system's various media, the information content of the token remains unchanged, except for that class of information which has been expressly reserved for media management purposes. Thus, each token within a database is unique as determined by its encoded information content, excluding media management information.

Tokens arise from events and are stored within data structures organized by the database designer/operator around subjects. With respect to any one subject zero to many tokens may be stored within the database. To establish the existence of a subject in the database a minimum of one token must be stored as a manifestation of and encoded with that subject. Each attribute encoded in each token stored within a subject data structure becomes an attribute also of that subject.

The methodology of the invention further organizes subjects into subject dimensions. This is accomplished by further encoding "association" and "aspect" information into portions of the token reserved for this purpose. The methodology of the invention places the definition of subjects and the definition of subject dimensions entirely in the hands of the database designer/operator.

In order to effectuate the movement of tokens among the various media, a media management process is established for each such media utilized in the overall storage scheme as meets the convenience of the information processing system operator. These media manager processes may be synchronous or asynchronous in their operation as appropriate to the overall data processing environment and the requirements of the system.

In other words, tokens can be copied from one media to another. After a successful copy has been completed, the original token becomes redundant and its space may be recovered. This process is non-destructive of the token and the token remains unchanged except for that portion reserved for media management purposes.

In a preferred embodiment, operation of a transaction provides that a request for token additions to the database occurs only after a commit point has been confirmed. The preferred method for the prevention of several transaction processes from interfering with each other in the evaluation of possible new data state conditions is via the posting of enqueue lists. "Enqueue lists" are commonly used in the present art and well understood. The present invention embraces a method of encoding the "keys" of tokens in such a manner that all classes of tokens can coexist in any of the various media. This encoding process specifies a universal method of key construction useable by all tokens regardless of their purpose or storage media.

The invention allows for the creation and manipulation of tokens which, once created, are never destroyed.

A second feature of the invention is the creation of tokens whose structure is readily distinguishable among tokens when not altogether common. This is achieved by the obligatory use of protocol coding.

A third feature of the invention is the creation of tokens with data elements which fully describe the subject matter which the token was devised to express such that any one copy of a token may be used to produce all other copies of the token necessary for the maintenance, creation, recreation, or duplication of every subject data structure in which the token could participate.

A fourth feature of the invention is the creation of tokens, such that when all tokens are taken together, the database of information so created is time dimensioned premised on the axiom that events are the sole basis of information and that events always occur at some point within the time continuum.

A fifth feature of the invention is that a token copy can be simultaneously filed under several subjects. Each token is encoded with subject, association, and aspect coding as meet the convenience of the database operator. The elements of each copy are identical, except for those elements expressly reserved for media management.

The token so created has the following characteristics:

1. Each token is created to carry information about one or more dimensions of an event as well as about itself.

2. Each token, in its construction, follows a consistent pattern.

3. Each token is created from obligatory information and discretionary information.

4. Once created, a token can never be altered.

5. Each token is created with provisions by which new values for established dimensions may be stored in a non-destructive manner.

6. Each token is created with provisions by which new dimensions may be subsequently ascribed in a non-destructive manner.

7. Each token is created with provision by which some or all of the universal dimensions of an event may be expressed and used to express subject data structures based on those dimensions.

The database so created has the following characteristics:

1. A token copy is created for each subject which the database operator desires to express as a data structure.

2. Each dimension or dimension cluster of a subject is a token stack or a potential token stack.

3. The most recent token stored in the database is current of its respective stack.

4. The population of tokens current of the dimensions of a subject represent the current state of that subject.

5. Tokens are never updated or deleted, only stored or retrieved. This flows from the proposition that an event is a fact forever.

6. All states of the database are dynamically determinable at any time, as tokens are not permitted to be updated or erased.

7. Tokens move freely among the various types of storage media.

8. Each token stored in the database is unique as determined by the information encoded in it.

The invention allows the creation and manipulation of data tokens which, once committed to storage, are never destroyed (modified or deleted). Additional tokens are created to reflect changes to the data, the entire universe of such tokens being maintained to provide a complete historical record of the data.

BRIEF DESCRIPTION OF DRAWINGS

A fuller understanding of the present invention and the features and operation thereof will be achieved upon consideration of the following description of a preferred, but nonetheless illustrative embodiment thereof, when reviewed in association with the annexed drawings, wherein:

FIG. 1 is a typical configuration of an encoded SUBJECT DATA token;

FIG. 2 is a typical configuration of a SUBJECT ROOT token;

FIG. 7 is an illustration of encoded subject identification information;

FIG. 7A is an illustration of encoded subject identification information expressed in the COBOL programming language;

FIG. 8 is an illustration of encoded event identification information;

FIG. 8A is an illustration of encoded event identification information expressed in the COBOL programming language;

FIG. 9 is an illustration of encoded ascription identification information;

FIG. 9A is an illustration of encoded ascription identification information expressed in the COBOL programming language;

FIG. 10 is an illustration of encoded event description information regarding several of the universal attributes of an event;

FIG. 10A is an illustration of encoded event description information expressed in the COBOL programming language;

FIG. 11 is an illustration of encoded subject dimension management information;

FIG. 11A is an illustration of subject dimension management information expressed in the COBOL programming language;

FIGS. 12 and 12A are illustration of the format for encoding a subject data token containing all of the elements identified above expressed in the COBOL programming language; and FIGS. 13 and 13a are illustration of a token encoded in accordance with the layout of FIGS. 12 and 12A.

DETAILED DESCRIPTION OF THE INVENTION

The present invention is premised upon the axiom that a subject comes into the domain of interest of the database designer/operator as a direct or indirect consequence of the occurrence of events, more generally, observation, interpretation, bilateral participation, and unilateral free association. Thus, with reference to FIG. 1, a Subject Data Token 10 is created to provide information about an event relating to the overall subject of the database.

It is to be appreciated that the physical embodiment of the token can be of any format for the presentation of data as known in the art. Information is coded into the token as signal strings with a protocol appropriate to the device in which the token is to be stored, held, or transmitted. The number of signals, overall, is protocol dependent. The order in which information appears is not significant, and all classes of information need not be present. In any one token, the various classes of information are mutually dependent, and taken together fulfill the original purpose of the token. Physical proximity is not required, but logical continuity must be maintained in order to permit the token to function as a singular entity, even while composed of complex parts.

Information of class A, shown is being located at physical position 12 in the token 10, is information relative to the token itself, transaction audit trail information, and media management.

Figures 6, 6A:
FIG. 6 is an illustration of the encoded management content of a token.
FIG. 6A is an illustration of encoded token management information expressed in the COBOL programming language.

As depicted in FIG. 6, which presents a typical breakdown for position 12, class A-type information is provided for token management, and is an assemblage of different types of data which can be used to identify, communicate, store, interpret and control the token. Some information may be stored external to the token itself.

As depicted in the Figure, class A information would include the token's "external" name or identification at 62. Protocol codes, identifying the format of the token and the encoding scheme used, such as ASCII, EBCDIC, etc., can be included, such as at location 64. Such data allows differently formatted tokens to be part of the same database. Similarly, compression schemes which may be utilized can be identified at 66.

Data relating to the length of data elements used for sorting or filing components, as well as the length of data appearing after such components, may also be included such as at 68 and 70. To conveniently identify the status of token management processes and similar actions a "status" identifier can be included, such as at 72. An identification of the management actions can be logged at 74. To identify the tokens relative position in the stack in which it logically resides, an entry may be included at 76.

To facilitate subsequent verification or analysis of the data in the token, it can be useful to include an identity of the node which contributed the token to the information system, such as 78, as well as the identity of the person or proxy which created the token, such as at location 80. Lastly, the token may be a member of a 'stack' whose 'height' represents a value. The stack value provided at location 82 may be used to record the value of the stack after taking into consideration the contribution of the token to the stack.

It is to be recognized, of course, that the specific location of each information element need not be as set forth in FIG. 6, so long as the location of the data is maintained on a consistent basis throughout the set of tokens within a specific protocol. FIG. 6A represents a representative form of the class A data, with fields assigned in the COBOL programming language.

Identifying information as to the specific subject of the token appears as class B, shown located at physical location 14 in the token. This class of information identifies the subject of the token which the operator/creator of the database has established, and is to be distinguished from the overall "subject" or enterprise for which the database is maintained. This class of information is always required to be present in an encoded form within the token. A fuller explanation of this information is contained in FIG. 7 at positions 86 through 104 and FIG. 7A at position 106.

As shown in FIGS. 7 and 7A, class B information encoded in a token is an assemblage of different types of data used to identify, communicate, store, interpret and control the subject matter which the token was created to manifest. Some information may be stored external to the token itself. Several of the data positions define the subject, while other positions define a dimension of the subject.

For example, position 88 can identify the database owner. This value may be used as the basis of a security administration scheme. The domain of control with which the database owner may use to administer a system of security may be indicated at 90. This provides a method of partitioning a database into logical security groupings.

The identity of the class of subjects around which the data structure is organized may be recorded at 92, while the identity of the specific subject instance represented by the data structure appears at 94. The identity of the class of identifier, if any, forming an association with the subject and expressing a relationship within the data structure may be set forth at 96. The identity of the specific associated instance appears at 98. The identity of the class of aspect identifier, if any, may be disclosed at 100, while the identity of the specific aspect instance appears at 102. Lastly, the session stamp assigned to the transaction which committed the token to be stored may appear at 104. In a preferred embodiment, the session may be represented as a counter value which decrements by one at the rate of $256 \times 10^6$ per second, and whose highest value represents "time 0", such as, for example, 00:00AM Jan. 1, 1990. Again, FIG. 7A depicts a representative embodiment of class B token information formatted in accordance with COBOL programming.

Information relative to the event which is the basis of the tokens's existence is located at position 16 as class C. This class of information identifies the event involving the subject, the existence of which created, directly or indirectly, an attribute, characteristic, or property of the subject. This class of information is always required to be present in an encoded form within the token, and is more fully depicted in FIG. 8.

Preferably, the portion of the token embodying class C information comprises five elements. The first, depicted at 110, comprises the date of the event's occurrence. The preferred embodiment represents the date in inverted format, wherein a descending sequence is used rather than the common ascending sequence. The time of the event's occurrence is recorded at 112. Again, the preferred represents the time in inverted format with a descending sequence. The nature of the event may be encoded at 114, while the identity of the class of instance identifier, if known and existing, may be inserted at 116. The identity of the specific actor may be recorded at 118. FIG. 8A depicts a COBOL embodiment of such a format.

Information class D, shown at position 18, is information relative to any amending or ascribing event referencing the original token identified by class C information. This class of information identifies the ascription event as well as the idea thereby ascribed. This class of information is always required to be present in an encoded form within the token. In the case of a token whose purpose is to be the original record of an event, class D information must contain appropriate "null" values indicating that no amendment or ascription has occurred. The preferred encoding method is one which sets ascription date and time and idea code to the computer's high-value representation and which sets the person, series and instance to the computer's space representation.

A fuller explanation of this information is contained in FIG. 9 at positions 124 through 132 and FIG. 9A. As presented therein, the date of the occurrence of the ascription event may be recorded at 124. Again, the preferred embodiment represents the date in an inverted descending format sequence. The time of the event's occurrence is recorded at 126, again in inverted descending format. Identification of the nature of the idea may be encoded at 128, while the identity of the class of the instance identifier, if known, is encoded at 130 to represent the person or proxy responsible for the event. Lastly, the identity of that person or proxy instance may be recorded at 132. A COBOL representation of the format for class D data section of the token is set forth in FIG. 9A.

Class E information, shown at location 20, is information relative to the description of the event which is the basis of the token's existence, being an addition to the information contained in class C and D. This class of information may be present at the convenience of the database operator. When included, and in conjunction with class C information, the six natural dimensions of the event are provided for as well as an "aspect" designation useful for relating complex series of events into an overall "business transaction".

FIG. 10, which depicts in greater detail the assemblage of token event description information, may include, at location 138, the identity of the class of location which describes the place of occurrence of the event. The specific location may be set forth at position 140. The identity of the class of aspect coding devised by the database creator to describe a particular aspect of a relationship concerning the token, such as a "purchase order" may be set forth at 142. The identify of the specific aspect instance qualifying the subject-associated relationship, or subject alone, if no relation exists, may be depicted at 144. The identity of the class of object which was the passive participant in an event of bilateral participation, or the object of ascription of an event of unilateral-free association may be identified at 146, with the specific identity of the object being set forth at 148. The identity of the class of controls, rules, laws or administrative mechanisms which govern the execution of the event may be provided at 150, while the identity of the specific control, rule, law or administrative mechanism is set forth at location 152. FIG. 10A depicts the COBOL coding for the class E data layout of FIG. 10.

Information of class F at location 22 provides for all other optional attributes, dimensions, characteristics, data fields, etc., as known in the art. An existing database could be made to conform to the present invention by constructing a token in accordance with the specifications of class A, B, C, D, and E information and by placing an exact copy of the existing database record in the class F position.

FIGS. 12 and 12A depict a complete construction, presented in the COBOL programming language, of a subject data token 176 incorporating all classes of information pertaining to the present invention. The token 176 bears all the elements of standard token construction as formulated by the present invention. Subsequent locations, not shown in the Figure, may carry any additional elements as known in the art. The precise order of elements is dictated by practical considerations at the discretion of the database designer/operator.

The first token stored with respect to a subject becomes the current measure or indicator of that subject's existence as well as the current measure or indicator of the encoded subject dimension.

The next token stored with respect to a subject serves to amend the subject. The new token created with respect to an encoded dimension of a subject becomes the current measure or indicator of that dimension. The token, if any, that was previously current of that dimension is "pushed down" as if it were in a stack. Each dimension of a given subject thus gives rise to a token stack, or a potential token stack. As each token is added to a dimension of a subject, and thereby pushes down that dimension's token stack, a new state comes into existence.

The description of the current state may be recorded in a subject root token, typically of a different, and shorter, format than the data tokens, whereby the identity of a current token can be determined. In the alternative, those tokens which are the current measure of the state of the subject can be determined by examining the key information stored within the tokens, simulating, as it were, the function served by the root token methodology. The subject root token so created becomes current of its own dimension, the subject dimension itself. In this manner, and by this method, all of the states that ever existed within the database are preserved.

FIG. 2 sets forth the construction of a typical subject root token 24. Such a token carries, at positions 26 and 28 the data of types A and B present in all tokens of the same subject. At position 30, data or information classified as type G which provides the identity of those tokens current of their respective dimensions with respect to the subject of the root token is provided. This area may also include information as to the location of the current token in the data space and/or storage media.

FIG. 11 presents a preferred embodiment of the layout of class G information. While a subject root token is optional to the creation of a database, the creation of such tokens facilitate identification, communication and control of the database. Position 158 bears data directed to the identity of the class of association which will partially define a subject dimension. The identity of the specific association instance is provided at 160. Similarly, the identity of the class of aspect, as well as the specific aspect instance which is utilized to partially define the subject dimension are encoded at 162 and 164, respectively.

The identity of the session identifying the transaction which caused the reference data token to be stored as a dimension of the instant subject appears at 166. Information relative to the type of media upon which the token copy may be stored may be provided at 168. In a single media environment, this information can be eliminated. Information relative to the device upon which the token copy may be stored is set forth at 170. This information may be inputed from external clues and not carried. Information relative to the location of the token within the media and/or upon the device where the token copy may be stored is set forth at 172. This information also may be imputed from external clues and need not be carried. FIG. 11A depicts the COBOL coding for the creation of such a token area.

The subject root token thus contains the information needed to relate data tokens to the subject to which they apply. The population of subject root tokens, taken together, account for all subject data tokens in the database. The physical location and the physical media by which a token is stored can have no effect upon the operation of dimensions, subjects, stacks, currency, or states.

Tokens, both subject and subject root, exist in and move among various physical media at the convenience of the information processing system operator. All of the various media available to an information processing system, taken together, provide a data space of a size approaching infinity.

When a token is created it enters the next available position in the data space and conceptually remains there forever. The data space, while conceptually infinite in length, is in part resident in real devices with real limitations. Not all storage devices have the same characteristics of speed and utility. As conditions dictate, tokens may become eligible for storage in lower priority media. Notwithstanding this storage management, the token retains its permanent position in the data space continuum.

The preferred method for identifying a token's relative position in the space continuum is to construct a token identifier derived from the time value existing when the token was created. This is designated as the "session identifier" and is an obligatory attribute of every stored token. This identifier, however derived, must be unique within the data space and remain unchanged forever. Every event is characterized by at least six simultaneous dimensions, which can be recorded:

1. The time of the event's occurrence, commonly measured as calendar date and time of day, both administered by international agreement.
2. The actor which caused the event to occur.
3. The action which fairly characterizes the event.
4. The location where the event occurred.
5. The rule, law, administrative mechanism, control scheme or motive characteristic of the event's occurrence.
6. The object which participated in the event in the case of bilateral participation or the object to which the event was directed in the case of unilateral free association.

With respect to any one event, tokens may be stored within the database for each of its dimensions. The methodology of the invention encodes each such token with the appropriate subject series and subject instance information within a position of the token specifically reserved for this purpose.

Figure 3:
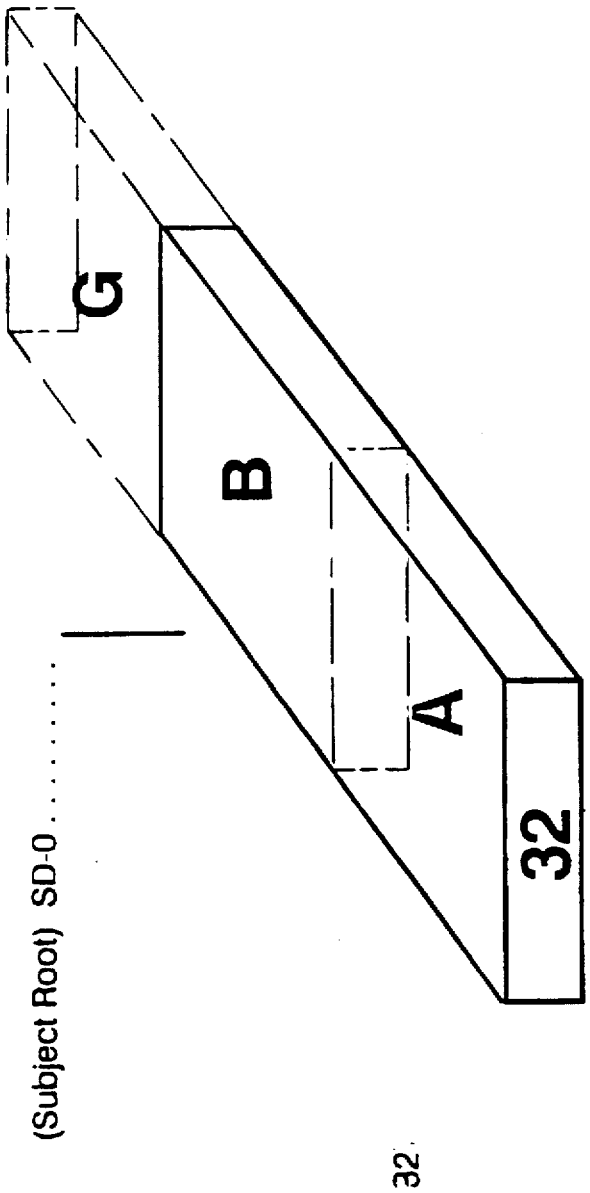
FIG. 3 is an illustration of a portion of the database state upon the conclusion of a first transaction.
Figure 4:
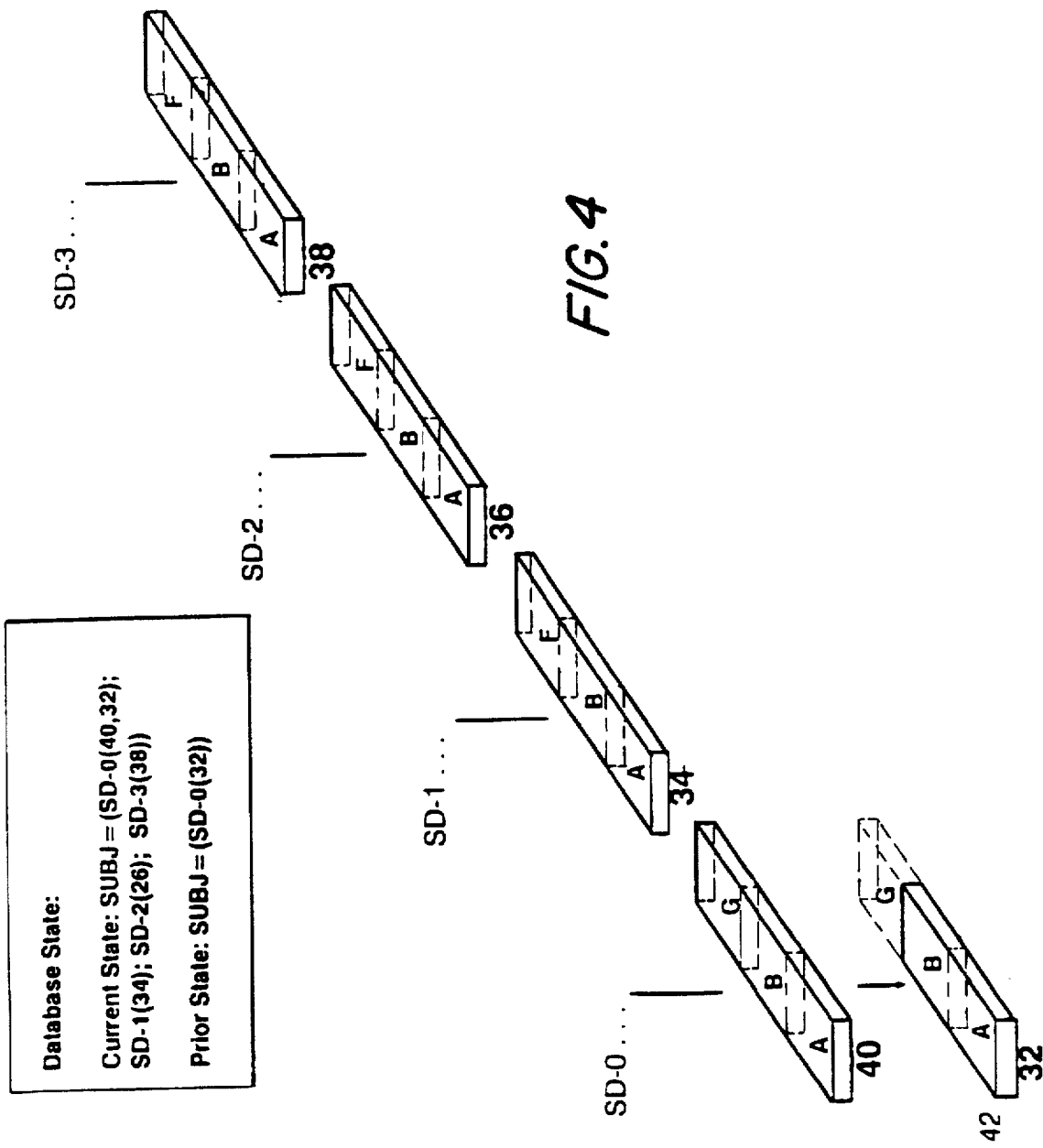
FIG. 4 is an illustration of the database state upon the conclusion of a second transaction.

FIGS. 3 and 4 depict two stages in the procedure of the present invention. In FIG. 3, which depicts the step of a first transaction, a single subject for which an entry in a data processing system is to be made comes to the attention of the database operator. That operator causes a root token 32 to be created for the subject. The root token contains at least the data defined in FIG. 2, although, since it may have no active dimensions, class G information may be absent.

There is no requirement that subject data tokens be stored during the same transaction. The storage or non-storage of subject data tokens during any single transaction is at the convenience and discretion of the database operator. The operator may elect to store a subject data token first and dynamically "configure" the root token as the need arises for its function.

In a second transaction, shown in FIG. 4, the database operator has caused three tokens 34, 36 and 38 to be generated. Each of the tokens, as a matter of illustration, expresses a different dimension of the subject. At the conclusion of the transaction, the original subject root token 32 of FIG. 3 is logically "pushed down" into position 42 and replaced by a newly generated root token 40. The new subject root token 40 contains the identity of each active dimension of the subject as developed and recorded by the tokens 34, 36 and 38, as well as the identity of the tokens 34, 36 and 38 themselves, which carry thus current data relative to those dimensions. Of course, if other tokens relating to the subject were created at an earlier episode, the information relating to such tokens would similarly appear in the new root token 40.

Figure 5:
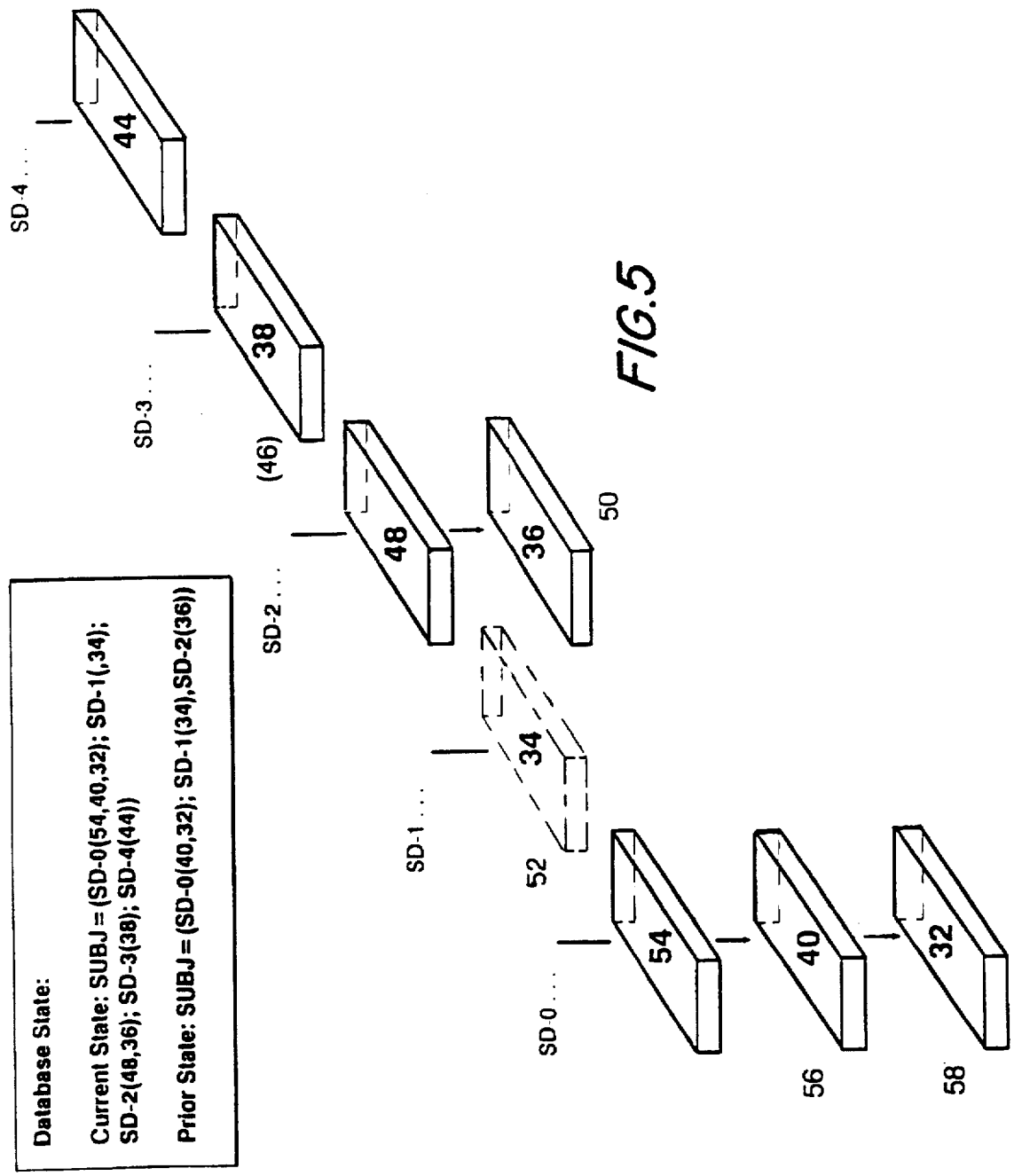
FIG. 5 is an illustration of the database state upon the conclusion of Transaction Three.

Turning to FIG. 5, a series of subsequent events are illustrated. New token 44 is created and stored, by which a new dimension of the subject is established. In addition, a new value or series of values are presented in new token 48 for an established dimension of the subject. This causes the then existing token 36 for that dimension to be displaced as current of that dimension and pushed down into position 50. As new dimensions are defined and tokens added, the "width" of the database for the subject is increased. The present invention permits additional dimensions to be defined and added as required to properly and completely define the subject, without affecting or altering previously-recorded information.

Token 34, at location 52, represents a "null" value for an established dimension. A null value is the indication that the complete absence of values exists for the dimensions of the subject. The effect of this indication is to remove the existing stored token, such as 34, from being current of that dimension, with the result that no token is current for an established dimension. In essence, the null value is a placeholder, allowing a dimension to be defined without assigning values for the dimension.

A new Subject Root token 54 is stored as of the completion of the episode, including the proper references to tokens 48, 38 and 44, and thereby causing the prior subject root token 40 to be displaced into position 56, now no longer current for the subject. Root token 40 similarly displaced root token 32 during an earlier transaction, which token now "drops" to location 58.

FIGS. 13 and 13a depicts the construction and operation of a database of the present invention by illustrating the contents of keys of stored tokens. Each token, by its encoded information, tells a part of the continuing story of the interactions between a utility company and one of its customers. This illustration has been limited to just those representative tokens needed to explain the operation of the present invention. Over an extended period of time there may be thousands of interactions and thus thousands of tokens recording those interactions.

A particular feature of the invention is the ability to cluster tokens by subject matter utilizing a preferred method of key construction embodied in the example, and further, utilizing well understood "keyed access" storage methods of the art. Each token observes the same protocol and therefore the same standard of construction.

With respect to FIGS. 13 and 13a, locations 182 through 202 identify "columns" within the token keys. Vertical bars are utilized in the illustration as column separators to enhance readability. These vertical bars are not intended to represent encoded information. Similarly, three lines are utilized to present the data. The machine readable coding for dates, for example, is also presented in the Figure in alphanumeric form, representing the International Standards Organization format for date/time representation. 11 tokens, 204 through 224, are represented. The encoded data is shown both in readable and machine language form as appropriate. It is to be appreciated that the actual coding of data for storage and processing purposes need not follow such formats.

The encoding in column 182 is the same for all tokens. "Folio" represents the combination of "client" and "domain" as referenced above. "Folio" represents the alias which the database operator has devised to represent the enterprise, in this case a utility company. The enterprise acts through its employees, proxies, and agents as institutionalized in our society through the laws of employment and the laws of agency. This may be thought of as the "subject" of the database.

In column 194 it will be observed that the "actor" identified is either a "CUST", meaning the customer as known in the database by the designation shown, or "CREP", meaning a customer representative of the enterprise acting as an employee, proxy, or agent and known by the designation shown. In the instant example the actor is typically known, however there are valid cases where the actor is unknown or unknowable. In such cases the encoding in column 194 is left "blank".

Tokens 204 through 212 are a part of the subject "WBUY133001910300". This alias was devised by the database operator to represent a utility purchase agreement or contract for service between the utility and a customer. Tokens 214 through 224 are a part of the subject "CUST5294350". This alias was devised by the database operator to represent the legal entity in the role of the customer who is a party to purchase agreement WBUY133001910300 pursuant to contract and the public tariffs and regulations regarding such arrangements.

The arrangement of tokens is in a manner convenient to the database operator. The particular arrangement illustrated optimizes the maintenance of clusters of tokens, the operation of subject dimensions, and token stacks by encouraging the storage of tokens in physical proximity within the particular media of choice.

The sequence of events begins with token 214. On May 23, 1983 (EVENT in column 190) the person made himself known to the enterprise, in this case by requesting utility services. This caused the database operator to assign an alias, customer number 5294350, to the person, from a series of values set aside for the "CUST" series of identifiers. On the date of May 23, 1983 the database operator caused token 214 to be committed to storage. In preparing the token, the "CUST" identifier was chosen as the "subject" of the token. Nothing was chosen for "association", but "****" was chosen as an "aspect" identifier to designate that his particular token established a new "subject" within the database.

A session stamp (column 202) was also encoded. Since, in fact, the present invention did not exist in 1983, the session identifier which would have been encoded then must be approximated, and is shown in the appropriate form with a date also of May 23, 1983 at "midnight" (00 hours, 00 minutes and 00.0000 seconds). The "actor" appearing in column 194 is blank because the identity of the service representation who interacted with the customer on or about May 23, 1983 is unknown and perhaps unknowable, or perhaps not worth knowing.

The "action" appearing in column 192 is encoded "-LP-" which has been chosen by the database designer to represent the action of recognizing the existence of a legal entity. The actor or "recognizer" in column 184 was a service representative whose identity is presently unknown. Thus, the column is blank.

Two other events occurred on May 23, 1983 which are manifested by tokens in the Figure. While the enterprise established an alias identifier via action "-LP-" represented by token 214, two additional actions were necessary to complete the "arrangements" for utility service. The customer had to "declare" his/her name and address, and the customer also had to "agree" to the terms of a legally binding contract for the delivery of services by the enterprise.

Token 218 manifests the person's declaration of name and address. In this case the "actor" could only have been the customer or his/her agent, and thus this value is encoded with the identifier assigned at the time of the creation of token 214.

The declaration of a name and address by the customer as manifest by token 218 serves to add a dimension to the subject "customer". The database operator has a choice as to how to encode the "association" and "aspect" elements of the token, and has here elected to simply encode "NAME" as the aspect series to implement this dimension of subject "CUST5294350". Should other simultaneous names and addresses be in effect for this single customer, an "instance" value of this particular aspect can be utilized to distinguish these added dimensions and their corresponding stacks.

Note that the discussion has yet to refer to token 216. It corresponds to an event which occurred sometime after May 23, 1983 and will be treated later in the chronology.

The final event of May 23, 1983 was the "acceptance" by the customer of the terms and conditions of the offer of utility service. This action is represented by the tokens 224 and 204, representing event 224 for the previously-identified customer, an event 224 for the utility, corresponding to the creation of the agreement between them. One other token, which is not shown in this illustration, was also created. The act of acceptance created a legally binding contract between buyer and seller. The "actor" is the person making acceptance known by the alias CUST5294350. The offeror is the enterprise, known by the "folio" carrying the alias "C120A484".

As incorporated into token 224, the object of the agreement was service to be delivered at a location which is known by the alias "NODE133001910" encoded in column 186—"association". The "action" has been encoded "-WA-". The aspect has been encoded with the agreement number known by the alias "WBUY133001910300".

As may be seen, both token 224 and token 204 are absolutely identical beginning with column 190, which is the beginning of the obligatory elements, and extending therefrom to the remainder of the token. (Assuming a left to right arrangement, where the token management and discretionary elements appear to the left of column 190.) In addition to the event of token 224 being duplicated with the subject "WBUY133001910300", a copy of token 224 was also taken for filing under the existing "NODE133001910" subject, which is another part of the same database. This allows records to be maintained and arranged by service location, as well as by customer and agreement number.

This ability to file true copies of a token under the subjects which the database operator may deem useful for his purposes is a fundamental feature of the present invention. It replicates the long standing practice of giving a true and fully executed copy of a contract to each of the parties thereto. The utility and the customer have acted to create a new subject, in this case a legal agreement. The fact of the customer's participation in this act is manifested by filing a copy of the agreement under the "customer" subject. This is consistent with the axiom that every event becomes a dimension of the actor, as well as of the time and place of its occurrence.

The fact of the utility's participation in this act is manifested by filing a copy of the agreement under the "NODE" subject (not shown here), and further by establishing a new "subject" in the database, that subject being the agreement itself.

On Aug. 2, 1993 the utility executed a computer program to check the validity of the postal address on file in token 218. The format of postal addresses, the designation of "zip" codes, carrier routes, etc., and the renaming of streets by a municipality are ongoing processes of unilateral free association in which the customer seldom directly participates. Periodically the postal addresses on file are checked to determine if they conform with "current" rules. During such an evaluation of Aug. 2, 1993, it was determined that the address on file needed "correction" or alteration of some sort. This was accomplished by taking a copy of customer-subject token 218, applying the appropriate correction, and storing a new token 216.

The new token was encoded with an "ascription" event date, shown in column 196, and an "idea" encoded to identify what was done or what opinion was rendered, shown in column 198. The identity of the ascriber is shown in column 200 as the encoded value "CREPADDRFIX-AUG93".

Token 216 shares the identical values with token 218 for columns 182 through 194. Due to the manner of encoding an ascription event time stamp via the method of the present invention, the ascending key sequence used in this illustration directed the storage of token 216 into a position "above" token 218.

It can be appreciated that if all discretionary elements (columns 182 through 188) were left "blank", the effect of the present invention would be to create a database of tokens in pure chronological sequence starting from the present and proceeding back into the past. This supports the axiom that time is an ever present feature of our universe and all events occur along the time continuum.

This push down effect is achieved by the use of an ascending collating sequence (in the present example) and the encoding of a date/time stamp in a descending sequence to produce the result of a time dimensioned stack wherein the most recent entry appears on the "top", namely as the first encountered entry when tokens are retrieved sequentially in an ascending key collating sequence. Tokens 216 and 218 are examples of a simple dimension in which the stack is composed only of one action type, which generally equates to a single "record" or "segment" type as commonly known in the art.

On Aug. 9, 1993, tokens 206 and 210 were created. Token 206 represents a summarization of useful information which the database operator collected together in furtherance of his purposes. It does not manifest an event between customer and enterprise, but rather the unilateral act of information gathering and storage in a convenient place, literally a "summary". The collection is related to the subject agreement, and is stored thereunder with an "aspect" of "WSUM". Note that time dimensioning is always present, thus when this same action is later performed, "WSUM" tokens encoded with action "-WH-" will appear as many times as necessary while each token so encoded will maintain its uniqueness. In the case of the present example, one such summary is intended to be created at approximately monthly intervals since the creation of the agreement in May 1983. By operation of time dimensioning, these summaries would be stored in last-in, first-out sequence with the most recent, (Aug. 9, 1993) appearing first, and the oldest, (approximately June 1983), appearing last, or lowest in the "stack". These tokens lower in the stack are not shown in the Figure.

Token 210 was also created on Aug. 9, 1993. This token manifests a demand for money, a "bill for services" rendered under the terms of the operation of the agreement. The true demand for money is not the token, but rather the "bill" presented to the customer for payment. That bill is a unique document, manifesting also a unique event which is encoded in the token, and perhaps printed on the document with an "invoice" number. In this illustration the invoice for charges is associated with the provisions of the agreement between the utility and customer and is encoded accordingly. Token 210 carries the "subject" encoding of the agreement, and the "association" coding of the invoice number. The database operator has chosen to encode "WFEE433961356604". The date of the invoice is encoded in the manner of the present invention, as is the action and actor. The storing of token 210 establishes a new dimension of the agreement.

Token 222 is encoded with the date of Sep. 7, 1993, and manifests the action encoded "-LC-", wherein the customer as the actor presents money to the utility in payment of his/her obligation or obligations. The "session" stamp located in column 202 is encoded with the precise moment, to the limits of available precision, when this token was committed to storage in the database.

The association coding of token 222 represents the cash receipt "document" created by the database operator as a control mechanism for the administration of such things. This serves to add a new dimension to the customer, as it manifests an event in which he/she participated.

The next event of recordation is the association of the cash with the open charges. This is the well understood process of "cash application". The customer is associated with the agreement under which the demand for money was made by the event of acceptance, which in this case occurred about 10 years prior to the present event. That the monies represented by token 222 are related to the agreement represented by token 204 is a matter of unilateral free association. There is every possibility that they are not so related, such as when the cash was intended as a deposit, or for another agreement, or for another person, such as a relative or friend. Tokens 208 and 220 embody the proper association.

When the cash analysis event occurred, it was acknowledged that the receipt was associated with the illustrated agreement. The event date encoded in column 190 for both tokens 220 and 208 is that of token 222. However, note at column 202 that tokens 220 and 208 were not committed to the database as storable objects until just after midnight on Sep. 11, 1993. Thus an interval of approximately 4 days elapsed between the receipt event and the database storage event.

This illustrates a fundamental feature of the present invention wherein the action manifest by the token is independent of the manipulation of the token as an object in its own right.

To complete the analysis of tokens 220 and 208, note the encoded action. Token 220 is encoded with the action "-JC-" which signifies "accounting journal action" against cash, whereas the encoding of token 208 is that of "accounting journal action" against invoices, encoded with action "-JB".

Token 220 is encoded such that it becomes a member of a stack defined by the "association" of column 186 begun with the cash receipt event manifest by token 222. This is an example of a dimension characterized by a multiplicity of actions or events. It is a feature of the present invention that subject dimensions can be composed of highly complex combinations of events. In the same manner, token 208 becomes "top of stack" for the dimension of the agreement created when the invoice was created. This dimension is defined by the invoice number in column 186.

Finally, token 212 is a new invoice created on Sep. 8, 1993. Like token 210, it created a new dimension of the agreement and will typically experience the same "life cycle" as that illustrated for token 210, with similar tokens being created as the invoice is paid.

The invoice manifested by token 212 may be cancelled, in which case it will be pushed down by a similar token which carries proper ascription coding, in a manner similar to token 216, or it may be written off as a bad debt, in which case a token not here illustrated would be created and stored as "top of stack" in a manner similar to token 208, which "paid off" the invoice manifested by token 210.

As represented by the tokens in FIG. 13, the two depicted subjects, contract WBUY133001910300 and customer CUST 5294350 each are defined by various dimensions. For the contract the dimensions are characterized by the customer initializer **** and WSUM aspects, as well as the WA, JB and WB actions. Thus, 6 dimensions of this subject have been defined and are accessible on a chronological basis.

Similarly, the customer has 6 dimensions identified by the NAME and WBUY133001010300 aspects and the LP, LN, JC and WA actions.

It is a fundamental premise of the present invention that, while the exact sequence of events cannot be predicted, all events nonetheless conform to a predictable structure which the methods of the present invention translate into two dimensional objects suitable for storage in computing devices. The present invention provides a different means for recording and storing a history of such events.

I claim:

1. A method for creating and maintaining a data file in a data processing system having a data storage unit for an enterprise defined by a plurality of subjects subject to events to be memorialized, comprising the steps of:

establishing in said data storage unit a data record token structure of a single predefined format for the subjects and events to be memorialized, said token structure having a fixed location for identification data for the subject to which the token relates and a plurality of locations for recordation of subject dimension data in the form of association and aspect information affiliated with said subject and said event;

entering and permanently storing a data token record for each of said subjects of said structure bearing subject and dimension data for the subject of the token with reference to an initial state upon said data storage unit by writing said data onto said data storage unit in the form of a fixed length data record having predefined locations thereon for said subject and dimension data, said record including a first data location for receipt of data corresponding to the time of writing the data onto the storage unit and a second data location for receipt of data corresponding to the time of creation of the subject of the data record having the association and aspect information to be recorded;

writing onto said first data location the time of writing of the data onto the storage unit;

creating a new token of said predefined format for one of said subjects bearing subject and dimension data corresponding to a subsequent event in which said token subject is a participant, said data including data corresponding to the occurrence time of the event; and updating said data file by storing therein said new token data, including said occurrence time data, in said fixed length record form without destroying previously stored tokens for said subject and by writing into the data record for said new token data reflecting the time of writing said new token data upon the storage unit.

2. The method of claim 1 further comprising the steps of storing in said database a root data token record for each subject of a token in said data file and updating said root token concurrently with the storage of a new token to reflect on said root token the most current information related to said subject.

3. The method of claim 1 further comprising the step of maintaining a continuing time base as part of said data processing system and utilizing the time maintained thereon as the time of writing token data upon the storage unit.

* * * * *